United States Patent [19]

Hafla

[11] Patent Number: 4,796,652

[45] Date of Patent: Jan. 10, 1989

[54] PRESSURE REGULATOR FOR HYDRAULICALLY CONTROLLED MACHINE TOOLS

[75] Inventor: Dietmar F. Hafla, Hohengehren, Fed. Rep. of Germany

[73] Assignee: Index-Werke Komm.-Ges. Hahn & Tessky, Fed. Rep. of Germany

[21] Appl. No.: 76,220

[22] Filed: Jul. 22, 1987

[30] Foreign Application Priority Data

Jul. 25, 1986 [DE] Fed. Rep. of Germany ....... 3625222

[51] Int. Cl.⁴ .......................................... F15B 13/043
[52] U.S. Cl. .............................. 137/116.3; 137/505.22; 137/599
[58] Field of Search ................. 137/116.3, 505.22, 599

[56] References Cited

U.S. PATENT DOCUMENTS

| 2,984,251 | 5/1961 | Quinby | 137/116.3 |
| 3,225,619 | 12/1965 | Schaefer | 137/116.3 X |
| 4,657,041 | 4/1987 | Mitsui | 137/116.3 |

FOREIGN PATENT DOCUMENTS

| 1162654 | 2/1964 | Fed. Rep. of Germany . |
| 2908018 | 9/1980 | Fed. Rep. of Germany . |
| 57-83701 | 9/1982 | Japan . |

*Primary Examiner*—Gerald A. Michalsky
*Attorney, Agent, or Firm*—Leydig, Voit & Mayer

[57] ABSTRACT

A pressure regulator for hydraulically controlled machine tools comprises a first directly controlled three-way pressure-regulating valve with which required work pressure can be set by a machine control system. In addition to a first surface, the control spool is provided with a second surface to which hydraulic fluid under the pressure at the pressure port can be applied by means of an externally controllable valve. This results in an additional force acting upon the control spool in the direction opposite to, or in the direction of, the force exerted by the elastic element on the control spool.

32 Claims, 3 Drawing Sheets

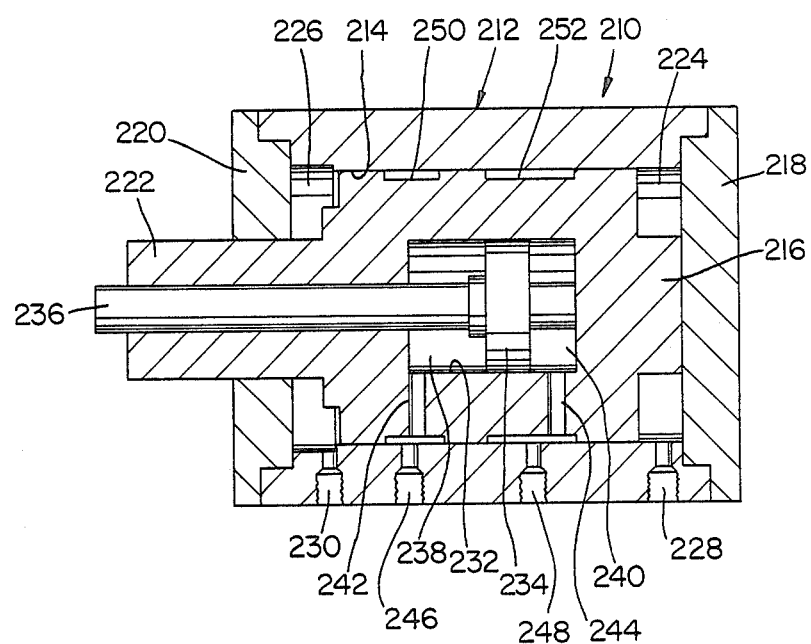

PRESSURE REGULATOR FOR HYDRAULICALLY CONTROLLED MACHINE TOOLS

BACKGROUND OF THE INVENTION

The present invention relates to pressure regulators for hydraulically controlled machine tools.

Use of devices actuated by a pressure medium in machine tools, for example, for hydraulic clamping cylinders, hydraulic tailstock sleeves and steady rests requires maintenance of a certain work pressure throughout the entire machining time in order to ensure safe clamping of the workpiece. On the other hand, the certain work pressure should not be exceeded as this could result in damage to the chucks or the workpiece.

In hitherto known machine tools, the work pressures are set by pressure-regulating valves with directly controlled spools which enable regulation of a settable work pressure and must be adjusted manually. Therefore, a pressure-regulating valve is provided for each work pressure and, as a result, up to four pressure-regulating valves must be adjusted by hand prior to a machining operation.

Pressure regulators which are adjustable by a machine control system are known, but these are pilot operated valves and seat valves which are not suitable for use in machine tools as they are sensitive to vibration and dirt and are thus susceptible to failure. For example, a chip under the conical or spherical sealing seat of a pilot operated valve changes the set pressure in an uncontrolled manner in the downward direction, with the result that the above-mentioned work pressure can no longer be maintained. Therefore, on account of their low susceptibility to failure, only pressure regulators with a directly controlled spool can be used in machine tools.

Use of proportional magnets to adjust pressure regulators is also known. This is similarly not suitable for machine tools as the set work pressure must be maintained in the event of a power failure, otherwise the workpiece would come loose from the chuck or in the event of too high pressure, the chuck, its jaws or even the workpiece would be overstressed.

Thus, directly controlled pressure regulators are the only ones usable for machine tools, but have the disadvantage that the work pressure, which is set manually, is dependent upon the meticulousness of the operator. Also, the time required for setting in machines with otherwise short set-up times, for example, in numerically controlled machine tools, is excessive.

The object underlying the present invention is, therefore, to provide a pressure regulator with which the required work pressure can be set by a machine control system.

SUMMARY OF THE INVENTION

This object is achieved, in accordance with the present invention, with a pressure regulator of the kind described at the outset by providing the control spool with a second surface upon which hydraulic fluid under the pressure from the pressure port can be applied by means of an externally controllable valve to result in an additional force acting upon the control spool in the direction opposite to, or in the direction of, the force of the elastic element. Thus a force counteracting that of the elastic element can be increased or decreased thereby enabling the control spool to assume a position of equilibrium resulting in a constant pressure, at a different absolute value of the constant pressure. Hence activation or deactivation of the fluid to act upon the second surface by the machine control system enables direct switch-over of the pressure regulator to a different constant pressure without any necessity for tedious manual adjustments.

A further advantage of the pressure regulator of the present invention is that valves which can be switched very quickly can be used as externally controllable valves and the work pressure can be altered very rapidly. This is desirable in a change-over between different machining operations. For example, a high pressure is required for rough machining of a thin-walled workpiece while a lower pressure is needed for the finishing. When switching over from high to low pressure, the chuck/clamping cylinder combination must be opened and then closed again on account of safety check valves in the clamping cylinder. Only during this opening motion of the chuck/clamping cylinder combination are the fitted check valves in the clamping cylinder open and high pressure can be switched over to low pressure. Since switch-over to another work pressure can be carried out very quickly with the pressure regulator of the present invention, this can take place during the opening motion.

The first described embodiment of the inventive pressure regulator provides the possibility of changing between two constant pressures. To enable setting of additional constant pressures, it is, therefore, advantageous to provide the control spool with additional surfaces to which hydraulic fluid at the pressure of the pressure port can be individually applied by means of controllable valves.

Since the number of surfaces which can be provided on the control spool is limited, in cases where as many constant pressures as possible are desired, a second directly controlled three-way pressure regulating valve with the same features as the first pressure-regulating valve can be connected in parallel with the first pressure-regulating valve with one of the pressure-regulating valves transferrable via switching elements into an active position and the other into an inactive position to regulate the constant pressure. With this embodiment of the pressure regulator, the pressures of the first pressure-regulating valve can be increased by the pressures of the second pressure-regulating valve. Of the pressures settable at the second pressure-regulating valve are made to differ from those of the first pressure-regulating valve, by utilizing an elastic element with a different bias or different dimensions of the surfaces acted upon by the hydraulic fluid or by both.

In a simple embodiment of a pressure regulator with a first and a second pressure-regulating valve, switchable directional valves are provided as switching elements between the inflow ports and the pressure ports of the pressure-regulating valves. Hence one of the pressure-regulating valves can be brought into the active position and the other into the inactive position by simply switching the directional valves between the inflow ports and the pressure ports.

A disadvantage of the above-described simple embodiment is that the switchable directional valves are very expensive and require a lot of installation space. It should also be borne in mind that the machine control system must include means to control each of the direction valves. For this reason, provision is made in an economical and space-saving embodiment of the pressure regulator of the present invention for the control spools to have an inactive position corresponding to the inactive position of the pressure-regulating valves in which they close the inflow, the outflow and the pressure port relative to one another, and for the switching elements to include an actuating element associated with each control spool to enable the control spool to be brought into the inactive position.

When the control spool is brought into the inactive position by the actuating elements, a problem is that the inactive position should be prescribed in a precisely defined manner. For this reason, it is advantageous for the housing to comprise stops against which the control spool can be brought to rest in the inactive position by the actuating element.

A particularly simple embodiment of the actuating elements is obtained with actuating pistons which are alternatively hydraulically activatable via a directional valve being provided as actuating elements.

In all hitherto described embodiments of the inventive pressure regulator of the present invention, a bias of the elastic element is presupposed as a constant size and the setting of the constant pressures is effected merely by activating different surface combinations acted upon by pressure. A further possibility of setting different constant pressures for the pressure regulator is obtained by use of an elastic element able to be biased by deformation under different forces and by providing a tensioning cylinder with which various biased positions can be established in a valve-controlled manner. These various biased positions of the elastic element enable the plurality of constant pressures settable by the combination of the pressure-activated surfaces of the control spool to be multiplied by the possible biased positions of the elastic element.

To enable setting of the constant pressures made possible by the biased positions, the biased positions may be settable by stops.

However, these stops only enable fixed differences in the forces. An absolute value of the bias of the elastic element in the individual biased positions is not possible with the above-described measures. For this reason provision is made, in an improved embodiment for an absolute value of the bias of the elastic element to be preselectable by adjustment members.

As explained at the outset, it is important that the pressure regulator maintain the preselected work pressure until it is switched over externally. Since, in all of the described inventive embodiments, setting of the selected constant work pressures is effected via valves, it is necessary, particularly considering the possibility of a power failure, for the valves to be in the form of locking valves which hold one respective position, thereby ensuring that they remain in the position which has been set by the control system until they are switched over by the control system.

In a preferred embodiment of the valves, these are adjustable via externally controllable magnets associated with each valve position.

Further features and advantages of the invention are apparent from the following description and the appended drawings of embodiments of the invention.

BRIEF DESCRIPTION OF THE DRAWINGS

FIG. 3 is a sectional part view of a double-piston cylinder for biasing springs which are used in the first and second embodiments.

FIG. 1 shows a first embodiment of an inventive pressure regulator for hydraulically controlled machine tools with a first pressure-regulating valve designated in its entirety by reference numeral 10 and comprising a housing 12 which, in turn, is comprised of a first housing section 14, a second housing section 16 and a third housing section 18.

Figure 1:
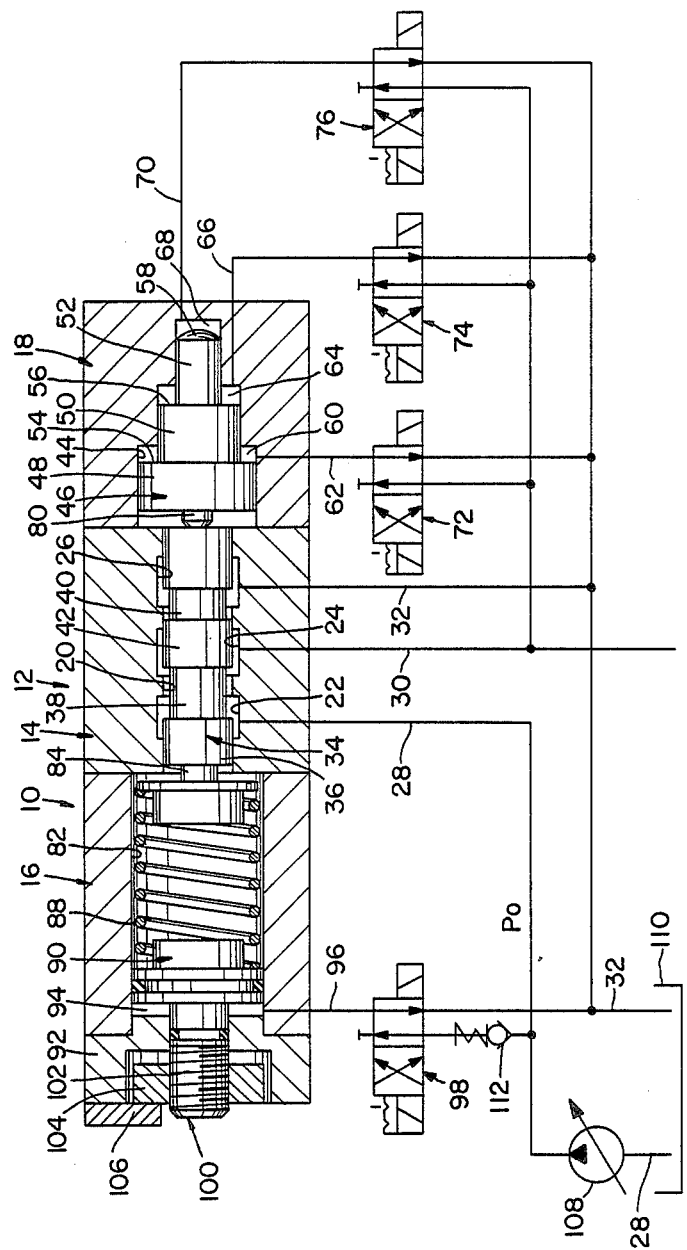
FIG. 1 is a schematic illustration of a first embodiment of the inventive pressure regulator.

The first housing section 14 is provided in the longitudinal direction with a cylindrical bore 20, extended in the radial direction by three annular grooves spaced behind each other in the longitudinal direction of the cylindrical bore 20, thereby forming an inflow chamber 22, a pressure chamber 24 and an outflow chamber 26. The inflow chamber 22 is in communication with an inflow pipe 28, the pressure chamber 24 with a pressure pipe 30 and the outflow chamber 26 with an outflow pipe 32.

A control spool 34 is guided by means of its lateral surface 36 in the cylindrical bore 20 so as to be movable in the axial direction. Machined in the lateral surface 36 of the control spool 34 in spaced relation to each other are two annular grooves 38 and 40. There, therefore, remains an intermediate portion 42 of the control spool 34 between the annular grooves 38 and 40.

The dimensions of the annular grooves 38 and 40 and of the intermediate portion 42 must be selected in dependence upon the spacing of the inflow chamber 22 from the pressure chamber 24, the spacing of the pressure chamber 24 from the outflow chamber 26 and the width of the pressure chamber 24 in the form of an annular groove so as to enable the control spool 34 to be shiftable from a position connecting the inflow pipe 28 with the pressure pipe 30, via a position closing the pressure pipe 30 relative to the inflow pipe 28 and the outflow pipe 32, into a position connecting the pressure pipe 30 with the outflow pipe 32. In the position of the control spool 34 in which the inflow pipe 28 is connected with the pressure pipe 30, the intermediate portion 42 interacts with a portion of the cylindrical bore located between the pressure chamber 24 and the outflow chamber 26 in such a way that the lateral surface 36 of the intermediate portion 42 sealingly abuts the above-mentioned portion of the cylindrical bore. Also, flow of a hydraulic fluid from the inflow pipe 28 via the inflow chamber 22, the annular groove 38 into the pressure chamber 24 and from there into the pressure pipe 30 is enabled. Hence the annular groove 38 must be wider than a portion of the cylindrical bore 20 located between the inflow chamber 22 and the pressure chamber 24. In the position in which the pressure pipe 30 is closed relative to the inflow pipe 28 and the outflow pipe 32, the intermediate portion 42 interacts with both the portion of the cylindrical bore 20 between the pressure chamber 24 and the outflow chamber 26 and the portion between the pressure chamber 24 and the inflow chamber 22 in such a way that the lateral surface 36 sealingly abuts both of these portions of the cylindrical bore. In the position in which the pressure pipe 30 is connected with the outflow pipe 32, the lateral surface 36 of the intermediate portion 42 sealingly abuts only the portion of the cylindrical bore 20 between the inflow chamber 22 and the pressure chamber 24 and hence prevents flow from the pressure chamber 24 to the inflow chamber 22. On the other hand, flow of a hydraulic fluid from the pressure pipe 30 via the pressure chamber 24, the annular groove 40 into the outflow chamber 26 and from there into the outflow pipe 32 is enabled. For this purpose, the annular groove 40 must be wider than the portion of the cylindrical bore 20 located between the pressure chamber 26 and the outflow chamber 24.

Adjoining the first housing section 14, viewed in the direction of an axis of the cylindrical bore 20 or of the control spool 34, is the third housing section 18 which comprises a three-step bore 44 arranged coaxially with the cylindrical bore 20, with diameters decreasing in size as the distance from the first housing section increases. A cylindrical step piston 46 with three lateral surface portions 48, 50 and 52 is guided in this three-step bore so as to be movable in the axial direction. The step piston 46 comprises a first annular surface 54 located between the lateral surface portions 48 and 50 and extending perpendicularly to the axial direction, a second annular surface 56 located between the lateral surface portions 50 and 52 and similarly extending perpendicularly to the axial direction, and, finally, a third round surface 58 formed by an end of the step piston 46 facing away from the first housing section 14 and extending substantially perpendicularly to the axial direction.

The first surface 54 encloses with part of the lateral surface portion 50 and with part of the three-step bore 44 a first volume 60 to which a first feed pipe 62 leads. In the same way, the second surface 56 encloses with part of the lateral surface portion 52 and part of the three-step bore 44 a second volume 64 to which a second feed pipe 66 leads. Finally, the third surface 58 encloses together with part of the three-step bore 44 a third volume 68 to which a third feed pipe 70 leads.

Arranged in the first feed pipe 62, the second feed pipe 66 and the third feed pipe 70, in each case, is a four-way valve used as a three-way valve, 72, 74 and 76 which, depending on the switched position, connects the respective feed pipe with either the pressure pipe 30 or the outflow pipe 32. Each of these directional valves 72, 74 and 76 is designed, in accordance with the invention, as a locking valve which remains in one of its two positions until it is brought into the respective other position. For this purpose, each directional valve is provided with two externally controllable electromagnets, each of which is associated with one position of the directional valve. As three-way valves are not obtainable as locking valves, four-way valves are used and one output is closed to make them operate as three-way valves.

Connection of the control spool 34 with the step piston 46 arranged coaxially therewith may vary in design. For example, it is possible for the control spool 34 and the step piston 46 to be of integral configuration, i.e., a coherent part. On the other hand, it may be advantageous from the manufacturing point of view for the control spool 34 and the step piston 46 to be separate parts, in which case, the step piston 46 then advantageously acts upon the control spool 34 through a spacer 80. In principle, however, it is in both cases essential that a displacement path of the control spool 34 be identical with a displacement path of the step piston 46 and that the spacer 80 be of such dimensions that the step piston 46 can act upon the control spool 34 throughout its entire displacement path through the spacer 80.

Arranged on a side of the first housing section 14 opposite the third housing section 18 is the second housing section 16 which similarly comprises a cylindrical recess 82 arranged coaxially with the control spool 34. Attached to one end 84 of the control spool 34 extending into the cylindrical recess 82 is a spring plate 86 which is acted upon by a spring 88 extending substantially in the axial direction of the recess 82. The spring, in turn, is supported at its end opposite the spring plate 86 against a tensioning piston 90 which is guided in the cylindrical recess 82 and sealingly abuts it. The cylindrical recess 82 is closed off by a cover 92 at its end opposite the first housing section 14. A volume 94 which is variable in accordance with a position of the tensioning piston 90 is enclosed by the cover 92, and by part of the cylindrical recess 82 and the tensioning piston 90. This volume 94 is in communication with a pipe 96 which, in turn, is connectable with either the inflow pipe 28 or the outflow pipe 32 via a directional valve 98 which is lockable in both of its positions.

To enable the position of the tensioning piston 90 to be defined in two locations, the tensioning piston 90 is provided with a piston rod 100 which extends through the cover 92 and carries a thread 102 with a nut 104 screwed onto it. The travel of the tensioning piston 90 is limited by the nut 104 either abutting the cover 92 or being spaced from the cover 92. In the latter case, it abuts a stop 106 secured to the cover 92 and limiting the travel of the nut 104 in the direction pointing away from the cover 92. Starting from the limited displacement of the nut 104, the thread 102 serves to shift the tensioning piston 90 in the cylindrical recess 82 to different extents in the direction toward the first housing section 14 and to thereby impart different biasing to the spring 88 in the direction toward the first housing section 14.

The inflow pipe 28 is supplied with a hydraulic fluid under pressure by a hydraulic pump 108 which draws hydraulic fluid from a reservoir 110 into which the outflow pipe 32 opens. For safety reasons, a check valve 112 is provided, in addition, in part of the inflow pipe 28 leading to the directional valve 98.

The inventive pressure regulator 10 operates as follows:

The hydraulic fluid is drawn from the reservoir 110 and a pressure $P_O$ is generated in the inflow pipe 28. Hence this pressure is also present in the inflow chamber 22 connected with the inflow pipe 28.

The pressure regulator 10 should first be in a non-regulating initial state in which there is no pressure in the pressure pipe 30. In this state, the control speed 34 is acted upon by the spring 88 only. It is, therefore, shifted to the right in FIG. 1 into the position in which it connects the inflow pipe 28 with the pressure pipe 30. Hence, a pressure likewise builds up in the pressure pipe 30 until a force counteracting that of the spring 88 is imparted to the control spool 34 and transfers it into the position closing the pressure pipe 30 relative to the inflow pipe 28 and the outflow pipe 32, thereby preventing further increase of the pressure in the pressure pipe 30.

This force counteracting the force of the spring 88 is achieved by the hydraulic fluid under the pressure in the pressure pipe 30 being applied to one of the surfaces 54, 56 or 58 of the step piston 46 or several of these surfaces jointly, which is enabled by a corresponding position of the directional valves 72, 74 or 76. The force counteracting the force of the spring 88 is measured by the pressure existing in the pressure pipe 30 and the surface available to the pressure, i.e., the size of the surfaces 54, 56 or 58, insofar as hydraulic fluid under the pressure in the pressure pipe 30 is applied to these. In other words, the pressure resulting in the pressure pipe 30 is that which correspond with a position of equilibrium of the control spool 34 in the position closing the pressure pipe 30. This position of equilibrium is determined, on the one hand, by the force exerted by the spring 88 in the direction of the first housing section 14 on the control spool and, on the other hand, by the force which counteracts that force and is produced by the pressure in the pressure pipe 30, by the surface 54,56 and 58 to which this pressure is applied and by the size of these surfaces.

Since the directional valves 72,74 and 76 enable hydraulic fluid under the pressure in the pressure pipe 30 to be applied to the surfaces 54,56 and 58, separately or jointly, the pressure resulting in the pressure pipe 30 can be preselected by different adjustment of the directional valves 72,74 and 76. In the present embodiment, seven surface combinations and hence seven different pressures in the pressure pipe 30 are possible:

1. first surface 54
2. second surface 56
3. third surface 58
4. first surface 54+second surface 56
5. first surface 54+third surface 58
6. second surface 56+third surface 58
7. first surface 54+second surface 56+third surface 58.

Hitherto, the setting of a regulated pressure in the pressure pipe 30 was described only when the pressure in the pressure pipe still lies below the regulating pressure corresponding to the position of equilibrium. It is, however, also possible for the pressure in the pressure pipe 30 to rise above the regulating pressure corresponding to the position of equilibrium. In this case, a force greater than the counterforce of the spring 88 is exerted by the pressure existing in the pressure pipe 30 via the preselected surfaces 54, 56 and 58 on the control spool 34 which is thereby shifted in the direction toward the spring 88 until it establishes a connection between the pressure pipe 30 and the outflow pipe 32. The hydraulic fluid flows, in this case, from the pressure pipe 30 into the outflow pipe 32 and from there into the reservoir 110 until the pressure in the pressure pipe 30 has dropped so far that a position of equilibrium of the control spool 34 in the position closing the pressure pipe 30 is re-established.

In the hitherto description of the mode of operation, it was assumed that a constant biasing of the spring 88 is prescribed. However, hydraulic fluid under the pressure $P_O$ in the inflow pipe 28 can be applied to the tensioning piston 90 in a manner controlled by directional valve 98. In this case, the tensioning piston 90 is shifted in the direction of the first housing section 14 until the nut 104 rests against the cover 92. The other position of the tensioning piston 90 is achieved by a position of the directional valve 98 in which the volume 94 is connected with the outflow pipe 32, with the result that the tensioning piston is pushed away from the first housing section 14 by the action of the spring 88 until the nut 104 rests against the stop 106. Thus, the spring can be biased to a greater or lesser extent by the two positions of the directional valve 98 which, in turn, results in an alteration of the position of equilibrium of the control spool 34 in the position closing the pressure pipe 30. Hence the constant pressure resulting in the pressure pipe 30 can also be altered by changing the bias of the spring 88. With the directional valve 98, it is, therefore, possible to prescribe two different biases of the spring 88 and hence also two different constant pressures in the pressure pipe 30. Thus, the above-mentioned seven different constant pressures in the pressure pipe 30 which are adjustable by the directional valves 72,74 and 76 can be increased to a total of fourteen different constant pressures in the pressure pipe 30. The absolute values of these fourteen pressures which are adjustable via the directional valves can be further varied by the nut 104 since turning of the nut 104 on the thread 102 enables continuous adjustment of the bias in the two positions of the tensioning piston 90 selectable by the directional valve 98.

Figure 2:
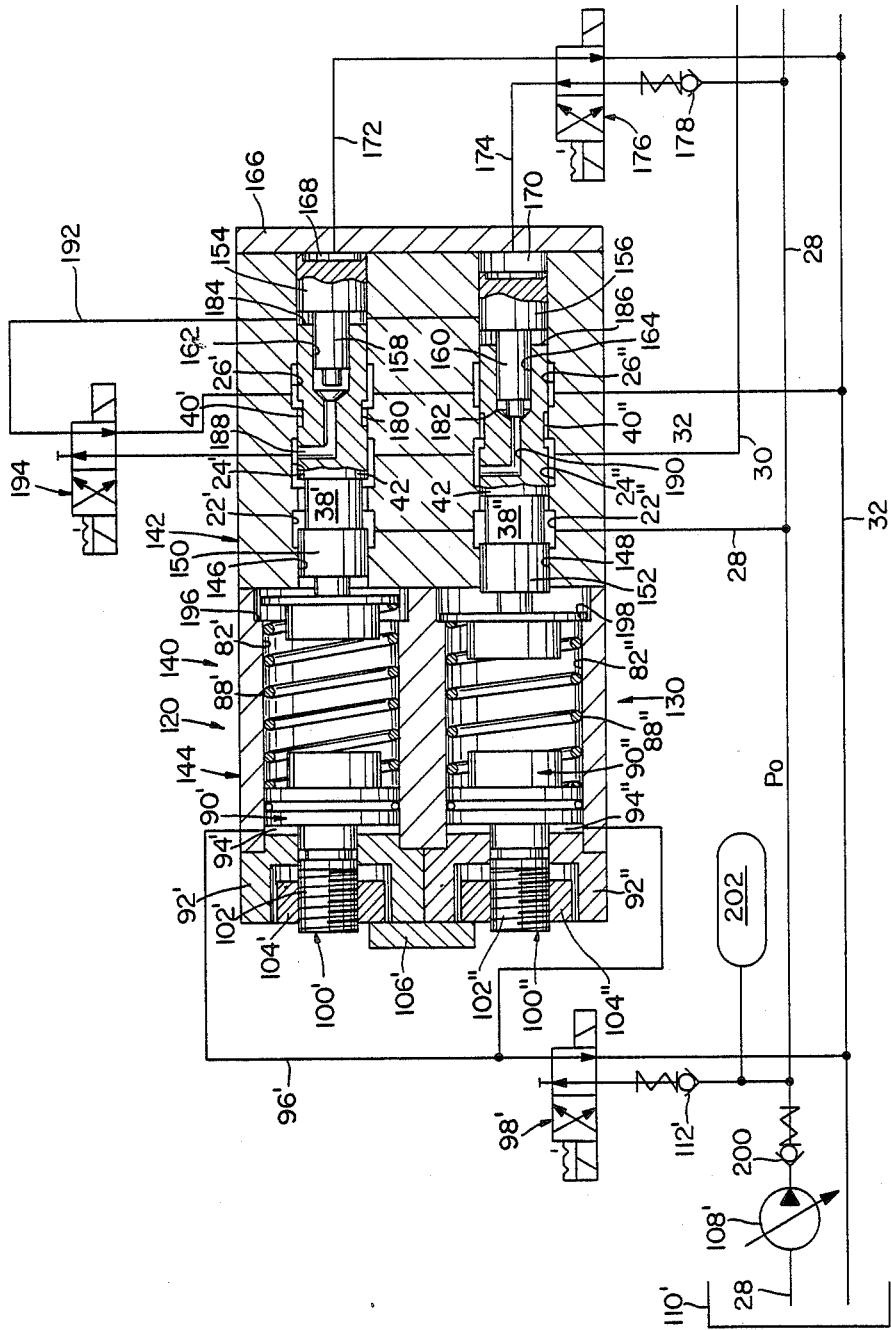
FIG. 2 is a schematic illustration of a second embodiment of the inventive pressure regulator.

FIG. 2 shows a second preferred embodiment of the inventive pressure regulator which is a combination of a first pressure-regulating valve 120 with a second pressure-regulating valve 130 in a common housing 140. The housing 140 is divided up into a first housing section 142 and a second housing section 144.

The first housing section 142 comprises two cylindrical bores 146 and 148 which extend through this housing section in the longitudinal direction thereof and parallel to each other. Like the cylindrical bore 20 of the first embodiment, these are provided with annular grooves forming inflow chambers 22', 22'', pressure chambers 24', 24'' and outflow chambers 26', 26''.

In each of the bores 146 and 148, a control spool 150 and 152, respectively, is mounted for displacement in the axial direction of the bores 146 and 148, respectively. As in the control spool 34 of the first embodiment, annular grooves 38', 38'' and 40', 40'' and also an intermediate portion 40', 40'' are provided in the control spools 150, 152. The same requirements as in the first embodiment shown in FIG. 1 apply to the dimensions for the annular grooves 38', 38'' and 40', 40'', the intermediate portions 40', 40'' and the spacings between the inflow chambers 22', 22'', the pressure chambers 24', 24'' and the outflow chambers 26', 26''.

In addition to the positions of the control spools 150 and 152 corresponding to those explained in conjunction with the first embodiment, the control spools 150 and 152 are additionally displaceable into an inactive position as illustrated, for example, by control spool 152 in FIG. 2. In this inactive position, the control spool 152 is displaced so far in the direction of the second housing section 144 that, on the one hand, the intermediate portion 42'' sealingly abuts a portion of the cylindrical bore 148 located between the inflow chamber 22'' and the pressure chamber 24'' and thereby separates the inflow chamber 22'' from the pressure chamber 24'' and, on the other hand, a portion of the control spool 152 adjoining the annular groove 40'' on a side opposite the intermediate portion 42'' sealingly abuts part of the cylindrical bore 148 located between the pressure chamber 24'' and the outflow chamber 26'', with the result that pressure chamber 24'' is also separated from outflow chamber 26''. In short, in the inactive position of the control spool 152, the inflow chamber 22'', the pressure chamber 24'' and the outflow chamber 26'' are separated from one another. This inactive position corresponds to a non-regulating position of the control spool 152.

As in the first embodiment, an inflow pipe 28 leads to both the inflow chamber 22' and the inflow chamber 22''. Similarly, the pressure pipe 30 leads to pressure chambers 24' and 24'' and also outflow pipe 32 is connected with outflow chambers 26' and 26''.

The provision on a side of the control spools 150 and 152 opposite the second housing section 144, in the cylindrical bores 146 and 148, of an actuating piston 154 and 156, respectively, which engages by means of a coaxial cylindrical projection a bore 162 and 164, respectively, of the control spool 150, 152 is a modification of the first embodiment. The actuating pistons 154, 156 are axially displaceable relative to the control spools 150, 152, but the cylindrical projections 158, 160 constantly engage the bores 162, 164 and sealingly abut these. An end of the cylindrical bores 146 and 148 opposite the second housing section 144 is closed by a plate 166 overlapping both cylindrical 146, 148. Thus, a volume 168, 170 forms between the actuating pistons 154, 156 and the plate 166, respectively, with the volume 168 being in communication with a hydraulic pipe 172 and the volume 170 with a hydraulic pipe 174. The two hydraulic pipes 172, 174 lead to a 4/2-way valve 176 which is also in communication with the inflow pipe 28 via a check valve 178 and with the outflow pipe 32. This 4/2-way valve is preferably a locking valve which locks in both positions and is brought into one of the locked positions, in each case, by an externally controllable electromagnet.

In contrast to the first embodiment, surfaces corresponding to the surface 54,56 and 58 are not formed by a step piston movable in a stepped bore, but by a surface 180 and 182, respectively, closing off the bore 162 or 164 in the direction toward the second housing section 144 and by an annular surface 184 and 186, respectively, remaining around the respective bore 162 and 164, respectively, on an end of the respective control spool 150, 152 opposite the second housing section 144. Since the cylindrical projections 158,160 sealingly abut the bores 162, 164, as described hereinabove, hydraulic fluid can be applied separately to the surfaces 180, 182 and 184, 186. To enable hydraulic fluid under a pressure existing in the pressure pipe 30 to be applied to the surfaces 180 and 182, the control spools 150, 152 are provided with a channel 188 and 190, respectively, which, on the one hand, opens into the pressure chamber 24', 24" in a lateral surface of the control spool 150, 152 in the region of the intermediate portions 42', 42", and, on the other hand, exits in the region of the surfaces 180, 182. A constant connection between the pressure chambers 24', 24" and volumes located in front of the surfaces 180 and 182, respectively, is thereby established. Hence hydraulic fluid under the pressure in the pressure chambers 24', 24" is constantly applied to the surfaces 180, 182.

A feed pipe 192 is provided to apply fluid to the surfaces 184 and 186. When the control spools 150, 152 are in the regulating position (as illustrated, for example, by the control spool 150 in FIG. 2) the feed pipe 192 opens into the cylindrical bores 146 and 148 between the actuating pistons 154, 156 and the control spools 150 and 152, whereby fluid can be applied to the surfaces 184, 186. To supply the feed pipe 192 with fluid at the pressure in the pressure pipe 30, a four-way valve is used as a three-way valve 194 to connect the feed pipe 192 to either the pressure pipe 30 or the outflow pipe 32. The directional valve 194 is preferably a locking valve which can be brought into its two locking positions by two electrically controllable magnets.

The second housing section 144 comprises recesses 82' and 82", respectively, which are arranged coaxially with the control spools 150 and 152, respectively, and contain springs 88' and 88", respectively. All of the parts for setting the bias of the springs 88' and 88" correspond to those of the first embodiment. Therefore, the same reference numerals, only with the addition of one appropriate or two apostrophes, have been used. In contrast to the first embodiment, the recesses 82' and 82" additionally comprise stops 196 and 198 against which the spring plates 86', 86" rest in the inactive position of the control spools 150, 152.

Finally, for safety reasons, in the event that pump 108' should fail, a further check valve 200 is arranged immediately after the pump 108' in the feed pipe 28 and the check valve is followed by a pressure accumulator 202. Insofar as they are identical with those of the first embodiment, all other parts bear the same reference numerals.

The second embodiment shown in FIG. 2 operates as follows:

Since the two pressure-regulating valves 120 and 130 are connected in parallel, i.e., the inflow pipe 28, the pressure pipe 30 and the outflow pipe 32 lead to the inflow chambers 22', 22", the pressure chambers 24', 24" and the outflow chambers 26', 26", respectively, one must first ascertain which of the pressure-regulating valves 120 and 130 is to regulate the pressure in the pressure pipe 30. For this reason, hydraulic fluid at the pressure $P_O$ in the feed pipe is applied via the 4/2-way valve 176 to either the actuating piston 154 or the actuating piston 156. If, for example, as illustrated in FIG. 2, fluid is applied to the actuating piston 156, it is displaced in the direction toward the second housing section 144 and thereby pushes the control spool 152 in the direction toward the second housing section 144 until the spring plate 86" rests against the stop 198 in the second housing section 144. As described at the outset, the control spool 152 is then in the inactive position, i.e., no connection is established between the inflow chamber 22", the pressure chamber 24" and the outflow chamber 26" by the control spool 152.

Hence regulation of the pressure is assumed solely by the control spool 150 because no pressure is applied to the associated actuating piston 154 which rests against the plate 166 and thus allows the control spool 150 to assume its regulating position.

An equilibrium of forces always occurs at the control spool 150 when the force of the spring 88' can be compensated by counterforces which in the case of control spool 150 are produced by applying pressure to surfaces 180 and/or 184. In this connection, it should be borne in mind that in the given construction, pressure is constantly applied to the surface 180 on account of the channel 188 and there is no possibility of preventing pressure from being applied to this surface by a directional valve. It is only possible to additionally apply hydraulic fluid under the pressure in the pressure pipe 30 to the surface 184 by directional valve 194 via feed pipe 192 or for fluid not to be applied to it by a corresponding position of the directional valve 194. Hence, in the pressure-regulating valve 120, activation of surfaces acted upon the pressure only offers the possibility of preselecting by means of directional valve 194 two different constant pressures corresponding to the position of equilibrium of the control spool in the position closing off the pressure pipe 30.

These two possibilities may be increased by a factor of 2 by additional adjustment of the spring bias by means of the tensioning piston 90', as explained in conjunction with the first embodiment. Hence a total of four constant pressures can be set with the pressure-regulating valve 120.

Four further constant pressures can be set with the pressure-regulating valve 130 in the same way as with the pressure-regulating valve 120 if by switching the 4/2-way valve 176, not the pressure-regulating valve 130 but the pressure-regulating valve 120 is brought into the inactive position and the control spool 152 of the pressure-regulating valve 130 can assume its regulating position. A precondition is that either the surfaces 182 and 186 to which pressure can be applied differ in size from those of the control spool 150 or that a spring 88" having a different spring constant than the spring 88' be selected. However, both the surfaces 182 and 186 and the spring constant 88" may differ from those of the first pressure-regulating valve 120.

Therefore, all in all, a total of eight different pressures can be set with the pressure regulator of the second embodiment shown in FIG. 2 by corresponding actuation of the directional valves 98, 176 and 194.

The possible number of settable pressures in the second embodiment may be further increased, in accordance with the invention, by activation and deactivation of the surfaces 180 and 182. The channels 188, 190 would then be replaced by other channels with directional valves.

In addition, the control spools 150, 152 may be provided with a step piston as in the first embodiment, with several surfaces which can be activated and deactivated, thereby further increasing the number of settable pressures.

FIG. 3 shows a preferred embodiment of a double-piston pressure cylinder 210 which could replace the tensioning pistons 90, 90' and 90" and would offer the possibility of setting four different biases of the springs 88, 88".

A housing 212 of the pressure cylinder comprising two pistons includes a cylindrical bore 214 in which a first piston 216 is displaceably mounted. The bore 214 is closed on either side by a cover 218 and 220, respectively. Formed on the first piston 216 is a first piston rod 222 which extends right through the cover 220.

A volume 224 and 226, respectively, which can be supplied with hydraulic fluid under pressure is formed between the cover 218 and the piston 216 and between the cover 220 and the piston 216, respectively. Hydraulic pipes 228 and 230 are provided for this purpose.

Arranged inside the first piston 216, coaxially therewith, is a cylindrical recess 232. Mounted for displacement in the latter is a second piston 234 with a second piston rod 236 coaxially penetrating the first piston rod 222.

Viewed in the axial direction, a volume 238 and 240, respectively, is formed on either side of the second piston 234. To supply these volumes 238, 240 with hydraulic fluid under pressure, two ducts 242, 244 arranged radially in the first piston 216 extend radially outwardly from these volumes 238, 240 to a lateral surface of the first piston 216. In each position of the first piston 216, these ducts 242, 244 should be in communication with a hydraulic port 246 and 248, respectively. For this purpose, two annular grooves 250 and 252 located opposite the hydraulic ports 246 and 248, respectively, are provided on the lateral surface of the first piston 216, with the duct 242 opening into the annular groove 250 and the duct 244 into the annular groove 252.

By alternate application of pressure to the hydraulic fluid in the volumes 224 and 226, respectively, a spring plate held on the second piston rod 236 can already be brought into two different positions by back-and-forth displacement of the first piston 216. By alternate application of pressure to the hydraulic fluid in the volumes 238 and 240, respectively, and resulting displacement of the second piston 234 between two extreme positions, each position of the first piston 216 can, in turn, lead to two different positions of the spring plate mounted on the second piston rod 236. Hence the spring plate can be adjusted to a total of four different positions.

Use of the hydraulic cylinder comprising two pistons to adjust the bias of the springs 88, 88' and 88" in the first and second embodiments shown in FIGS. 1 and 2, therefore, results in the possible number of settable pressures being increased by an additional factor of 2. In all, the first embodiment of the pressure regulator enables 28 pressure settings and the second embodiment of the pressure regulator 16 pressure settings.

What is claimed is:

1. A pressure regulator for hydraulically controlled machine tools comprising:
a first directly controlled three-way pressure-regulating valve with a housing including an inflow, an outflow and a pressure port for a hydraulic fluid, and with a control spool mounted therein which is movable back and forth between a first position connecting the inflow with the pressure port, a second position closing the pressure port and a third position connecting the pressure port with the outflow, with a constant pressure being settable at the pressure port, on the one hand, by a force being applied to the control spool by a biased elastic element in the direction of the position connecting the inflow with the pressure port, and, on the other hand, by the control spool having a first surface to which hydraulic fluid under the pressure at the pressure port is applied, by means of which a force counteracting the force of the elastic element acts upon the control spool, the control spool provided with a second surface to which the hydraulic fluid under the pressure at the pressure port can be applied by means of an externally controllable valve and, when applied, results in an additional force acting upon the control spool in the direction opposite to the force of the elastic element.

2. A pressure regulator as defined in claim 1, in which the control spool is provided with further surfaces to which the hydraulic fluid under the pressure at the pressure port (30) can be individually applied by means of controllable valves.

3. A pressure regulator as defined in claim 2 characterized in that:
a second directly controlled three-way pressure-regulating valve with the same features as the first pressure-regulating valve is provided, in that:
the second pressure-regulating valve is connected in parallel with the first pressure-regulating valve, and in that:
in order to regulate the constant pressure, one of the pressure-regulating valves can be brought via switching elements into an active position and the other into an inactive position.

4. A pressure regulator as defined in claim 1 in which a second directly controlled three-way pressure-regulating valve with the same features as the first pressure-regulating valve is provided, in which: the second pressure-regulating valve is connected in parallel with the first pressure-regulating valve, and in which in order to regulate the constant pressure, one of the pressure-regulating valves can be brought via switching elements into an active position and the other into an inactive position.

5. A pressure regulator as defined in claim 4 in which: switchable directional valves are provided as switching elements between the inflow ports and the pressure ports of the pressure-regulating valves.

6. A pressure regulator as defined in claim 4 in which: the control spools have an inactive position corresponding to the inactive position of the pressure-regulating valves in which they close off the inflow, the outflow and the pressure port relative to one another, and in which: the switching elements comprise an actuating element associated with each control spool and enabling the control spool to be brought into the inactive position.

7. A pressure regulator as defined in claim 6 in which: the housing comprises stops against which the control spools are brought to rest in the inactive position by the actuating elements.

8. A pressure regulator as defined in claim 7 characterized in that:
actuating pistons which are alternately hydraulically activatable via a directional valve are provided as actuating elements.

9. A pressure regulator as defined in claim 6 in which: actuating pistons which are alternatively hydraulically activatable via a directional valve are provided as actuating elements.

10. A pressure regulator as defined in claim 1 in which: the elastic element can be biased by deformation under different forces, and in which: a tensioning cylinder is provided to enable, in a manner controlled via valves, various biased positions to be established.

11. A pressure regulator as defined in claim 10 in which: the biased positions can be set by stops.

12. A pressure regulator as defined in claim 11 characterized in that:
an absolute value of the bias of the elastic element in preselectable via adjustment members.

13. A pressure regulator as defined in claim 10 in which: the valves are in the form of locking valves which hold one valve position.

14. A pressure regulator as defined in claim 13 in which: the valves are adjustable via externally controllable magnets associated with each valve position.

15. A pressure regulator as defined in claim 1 in which: an absolute value of the bias of the elastic element is preselectable via adjustment members.

16. A pressure regulator as defined in claim 1 in which: the second surface is smaller than the first surface.

17. A pressure regulator for hydraulically controlled machine tools comprising:
a first directly controlled three-way pressure-regulating valve with a housing including an inflow, an outflow and a pressure port for a hydraulic fluid, and with a control spool mounted therein which is movable back and forth between a first position connecting the inflow with the pressure port, a second position closing the pressure port and a third position connecting the pressure port with the outflow, with a constant pressure being settable at the pressure port, on the one hand, by a force being applied to the control spool by a biased elastic element in the direction of the position connecting the inflow with the pressure port, and, on the other hand, by the control spool having a first surface to which hydraulic fluid under the pressure at the pressure port is applied, by means of which a force counteracting the force of the elastic element acts upon the control spool, the control spool provided with a second surface to which the hydraulic fluid under the pressure at the pressure port can be applied by means of an externally controllable valve and, when applied, results in an additional force acting upon the control spool in the direction of the force of the elastic element.

18. A pressure regulator as defined in claim 17, in which the control spool is provided with further surfaces to which the hydraulic fluid under the pressure at the pressure port can be individually applied by means of controllable valves.

19. A pressure regulator as defined in claim 18, in which a second directly controlled three-way pressure-regulating valve with the same features as the first pressure-regulating valve is provided, the second pressure-regulating valve is connected in parallel with the first pressure-regulating valve, and, in order to regulate the constant pressure, one of the pressure-regulating valves can be brought via switching elements into an active position and the other into an inactive position.

20. A pressure regulator as defined in claim 17, in which a second directly controlled three-way pressure-regulating valve with the same features as the first pressure-regulating valve is provided, the second pressure-regulating valve is connected in parallel with the first pressure-regulating valve and, in order to regulate the constant pressure, one of the pressure-regulating valves can be brought via switching elements into an active position and the other into an inactive position.

21. A pressure regulator as defined in claim 20, in which switchable directional valves are provided as switching elements between the inflow ports and the pressure ports of the pressure-regulating valves.

22. A pressure regulator as defined in claim 20, in which the control spools have an inactive position corresponding to the inactive position of the pressure-regulating valves in which they close off the inflow, the outflow and the pressure port relative to one another, and the switching elements comprise an actuating element associated with each control spool and enabling the control spool to be brought into the inactive position.

23. A pressure regulator as defined in claim 22, in which the housing comprises stops against which the control spools are brought to rest in the inactive position by the actuating elements.

24. A pressure regulator as defined in claim 23, characterized in that actuating pistons which are alternatively hydraulically activatable via a directional valve are provided as actuating elements.

25. A pressure regulator as defined in claim 22, in which actuating pistons which are alternatively hydraulically ativatable via a directional valve are provided as actuating elements.

26. A pressure regulator as defined in claim 17, in which the elastic element can be biased by deformation under different forces, and a tensioning cylinder is provided to enable, in a manner controlled via valves, various biased positions to be established.

27. A pressure regulator as defined in claim 26, in which the biased positions can be set by stops.

28. A pressure regulator as defined in claim 27, in which an absolute value of the bias of the elastic element is preselectable via adjustment members.

29. A pressure regulator as defined in claim 17, in which an absolute value of the bias of the elastic element is preselectable via adjustment members.

30. A pressure regulator as defined in claim 17, in which the valves are in the form of locking valves which hold one valve position.

31. A pressure regulator as defined in claim 30, in which the valves are adjustable via externally controlled magnets associated with each valve position.

32. A pressure regulator as defined in claim 17, in which the second surface is smaller than the first surface.

* * * * *